United States Patent
Sakai et al.

(10) Patent No.: US 7,060,316 B2
(45) Date of Patent: Jun. 13, 2006

(54) OIL OR FAT COMPOSITION

(75) Inventors: Hideaki Sakai, Tokyo (JP); Masahiro Katada, Tokyo (JP); Minoru Ishibashi, Ibaraki (JP)

(73) Assignee: Kao Corporation, Tokyo (JP)

( * ) Notice: Subject to any disclaimer, the term of this patent is extended or adjusted under 35 U.S.C. 154(b) by 474 days.

(21) Appl. No.: 10/120,514

(22) Filed: Apr. 12, 2002

(65) Prior Publication Data

US 2003/0026886 A1 Feb. 6, 2003

(30) Foreign Application Priority Data

Apr. 13, 2001 (JP) ........................ 2001-115001
Feb. 19, 2002 (JP) ........................ 2002-041613

(51) Int. Cl.
*A23D 9/00* (2006.01)

(52) U.S. Cl. ............... 426/611; 426/601; 426/438; 426/330.6

(58) Field of Classification Search ............ 426/606, 426/607, 611, 330.6, 438
See application file for complete search history.

(56) References Cited

U.S. PATENT DOCUMENTS

| | | | |
|---|---|---|---|
| 4,656,045 A | | 4/1987 | Bodor et al. |
| 4,976,984 A | | 12/1990 | Yasukawa et al. |
| 5,077,069 A | * | 12/1991 | Chang et al. ............ 426/330.6 |
| 5,230,916 A | * | 7/1993 | Chang et al. ............ 426/330.6 |
| 5,514,405 A | | 5/1996 | Yokomichi et al. |
| 5,525,516 A | | 6/1996 | Krutak et al. |
| 5,879,735 A | * | 3/1999 | Cain et al. ................ 426/603 |
| 5,912,042 A | | 6/1999 | Cain et al. |
| 6,004,611 A | | 12/1999 | Gotoh et al. |
| 6,025,348 A | | 2/2000 | Goto et al. |
| 6,106,879 A | | 8/2000 | Mori et al. |
| 6,139,897 A | | 10/2000 | Goto et al. |
| 6,143,348 A | | 11/2000 | Cain et al. |
| 6,326,050 B1 | | 12/2001 | Goto et al. |
| 6,337,414 B1 | | 1/2002 | Sugiura et al. |
| 6,361,980 B1 | | 3/2002 | Sugiura et al. |
| 6,365,211 B1 | * | 4/2002 | Corrigan ................. 426/116 |
| 6,638,551 B1 | * | 10/2003 | Levy et al. .............. 426/330.6 |
| 6,858,247 B1 | * | 2/2005 | Sakai et al. .............. 426/611 |

FOREIGN PATENT DOCUMENTS

| | | |
|---|---|---|
| GB | 813538 | 5/1959 |
| JP | SHO 49-86577 | 8/1974 |
| JP | HEI 4-261497 | 9/1992 |
| JP | 04 261497 A | 9/1992 |
| JP | 05 316971 A | 12/1993 |
| JP | 10 127230 A | 5/1998 |
| JP | 2000 116324 A | 4/2000 |
| WO | WO 00/77133 A1 | 12/2000 |
| WO | WO 01/15550 A1 | 3/2001 |

OTHER PUBLICATIONS

Theory and Reality of Fried Foods (literature of a text book describing a general method for the production of fried foods) 3pp. Japanese Language.
U.S. Appl. No. 09/453,078, filed Dec. 2, 1999, pending.
U.S. Appl. No. 09/926,741, filed Dec. 11, 2001, pending.
U.S. Appl. No. 10/032,493, filed Jan. 2, 2002, pending.
U.S. Appl. No. 10/061,286, filed Feb. 4, 2002, pending.
U.S. Appl. No. 09/427,081, filed Oct. 26, 1999, allowed.
U.S. Appl. No. 09/809,192, filed Mar. 16, 2001, allowed.
U.S. Appl. No. 09/900,053, filed Jul. 9, 2001, pending.
U.S. Appl. No. 09/907,811, filed Jul. 19, 2001, pending.
U.S. Appl. No. 09/985,755, filed Nov. 6, 2001, pending.
U.S. Appl. No. 10/014,356, filed Dec. 14, 2001, pending.
U.S. Appl. No. 10/014,449, filed Dec. 14, 2001, pending.
U.S. Appl. No. 10/101,606, filed Mar. 21, 2002, pending.
U.S. Appl. No. 10/120,514, filed Apr. 12, 2002, pending.
U.S. Appl. No. 10/343,831, filed Feb. 10, 2003, Koike et al.
U.S. Appl. No. 10/343,748, filed Feb. 6, 2003, Koike et al.
U.S. Appl. No. 10/343,742, filed Feb. 6, 2003, Koike et al.
U.S. Appl. No. 10/019,427, filed Dec. 31, 2001, Masui et al.
U.S. Appl. No. 10/009,494, filed Apr. 8, 2002, Masui et al.
U.S. Appl. No. 10/120,514, filed Apr. 12, 2002, Sakai et al.

* cited by examiner

*Primary Examiner*—Carolyn Paden
(74) *Attorney, Agent, or Firm*—Oblon, Spivak, McClelland, Maier & Neustadt, P.C.

(57) ABSTRACT

An oil or fat composition containing 15 wt % or more of diglyceride (component (A)) and 70 ppm or more, on the basis of the diglyceride, of an organic carboxylic acid (Component (B)).

23 Claims, No Drawings

OIL OR FAT COMPOSITION

BACKGROUND OF THE INVENTION

1. Field of the Invention

The present invention relates to a diglyceride-containing oil or fat composition which is stable against thermal oxidation or hydrolysis and which has excellent flavor and appearance, to fried foods produced by use of the composition, and to a method of producing the fried foods.

2. Discussion of the Background

Recently, research has progressed to unveil a correlation between the distribution of fat in the body and a variety of life-style related diseases. Specifically, accumulation of visceral fat, such as fat in the abdominal cavity or liver fat, has bean shown to be highly correlated with not only obesity but also diabetes, hyperlipemia, liver diseases, hypertension, and other conditions and diseases. Therefore, reduction of body fat is considered critical for the prophylaxis and treatment of these conditions or diseases.

Exercise and diet are important means of reducing body fat, but in many cases difficulty is encountered in proper diet control. Pharmaceutical therapy is another approach for reducing body fat, but can involve a concern in terms of safety.

Diglycerides, which are known to have an effect of reducing accumulation of body fat and preventing obesity, have recently become of interest, and diglyceride-containing edible oils have already been on the market (see Japanese Patent Application Laid-Open No. 10-176181). However, like triglycerides, diglycerides are susceptible to hydrolysis and oxidation when stored or heated for a long time. Fatty acid generated during hydrolysis lowers the smoke point of oil, to thereby permit issuance of odor during cooking and to also hamper efficient cooking work. Also, oxidation raises problems, such as deteriorative smell and coloring of the oil. Hitherto, no effective method has been known to improve the stability of triglycerides against hydrolysis. Meanwhile, techniques are known to prevent oxidation of triglycerides, including addition of a variety of anti-oxidation agents to frying oil or fat (hereinafter "oil or fat" may be referred to simply as oil, and the term "frying" is used to encompass stir-frying, deep-frying, and any other similar methods of cooking by use of oil) and addition of citric acid as a synergist for the anti-oxidation agent ("Theories and Practice of Fried Foods" published by *Saiwai Shobo*, 1976). In particular, citric acid or a salt thereof employed in the latter method is sparingly soluble to triglycerides, and improvement is desired with respect to its effect (Japanese Patent Application Laid-Open No. 49-86557).

In 1983, isopropyl citrate was approved as a food additive for its function of improving solubility of citric acid as a salt thereof to triglycerides. However, since isopropyl citrate is produced from isopropyl alcohol, the amount of isopropyl citrate which can be incorporated into an oil or fat is currently restricted to 100 ppm or less (Manual for Japanese Official Compendium of Food Additives, 1999).

In connection with oils and fats consumed under severe conditions by professionals engaged in culinary enterprises such as restaurants, fast food shops, and fried food manufacturing plants, there remains a strong need for improved stability of triglycerides and diglycerides against oxidation. In order to meet this need, in same cases, ascorbyl palmitate, tocopherol, as a similar compound capable of serving as an antioxidant is used in large amounts. However, addition of these antioxidants in large amounts increases acid value, which is associated with an increased amount of smoke and a change in oil color during cooking. Moreover, fried foods produced by use of an oil containing such an additive involve problems in terms of quality; e.g., degradation in flavor, color tone, and appearance, which is partly attributed to soap smell from fatty acid generated through decomposition of the oil.

There is proposed a method for preventing oxidation by use of catechin (WO 00/77133). Although catechin significantly improves stability of oil or fat against oxidation, its effect of preventing hydrolysis of oil or fat is not necessarily satisfactory.

It is also disclosed, a method for preventing disproportionation from diglycerides to triglycerides and monoglycerides during a deodorization process by use of citric acid (Japanese Patent Application Laid-Open No. 4-261497). However, the document has no indication that citric acid prevents hydrolysis of diglycerides containing oil.

In view of the foregoing, the present inventors have performed research on the stability of oils or fats containing diglyceride, which has the effect of preventing accumulation of body fat, against hydrolysis and thermal degradation caused by long-term storage or heating, and have discovered a peculiar phenomenon that organic carboxylic acids, which are sparingly soluble to triglycerides and thus are unsatisfactory in their effect to stabilize triglycerides, are abundantly soluble to diglycerides. They have also discovered that organic carboxylic acids exhibit a significant effect on the aforementioned stability; in particular, prevention of hydrolysis of a diglyceride-containing oil or fat. In short, the present inventors have found that when a certain amount of organic carboxylic acid is added to an oil or fat of high diglyceride content, there can be obtained an oil or fat composition for frying use which is stable against thermal oxidation or hydrolysis—which conventionally cannot be avoided after long-term storage or heating—and whose smoke point is resistant to lowering during the course of cooking, and that cooking by use of the oil composition provides fried foods of excellent flavor and appearance.

SUMMARY OF THE INVENTION

Accordingly, an object of the present invention is to provide an oil or fat composition which, when stored for a long time or heated, is stable against thermal oxidation or hydrolysis and which has excellent flavor and appearance.

Another object of the present invention is to provide a fried food produced by use of the composition.

In one aspect of the present invention there is provided an oil or fat composition comprising the following components (A) and (B):

(A) 15 wt. % or more of a diglyceride; and (B) an organic carboxylic acid:

70 ppm or more on the basis of said diglyceride.

In another aspect of the present invention, there is provided a fried food produced by use of the oil or fat composition.

In still another object of the present invention, there is provided a method for producing the fried food.

DETAILED DESCRIPTION OF THE PREFERRED EMBODIMENTS

The oil or fat composition of the present invention (hereinafter may be referred to as the oil/fat composition of the present invention) contains diglyceride, which serves as component (A), in an amount of 15 wt % (hereinafter wt % will be referred to simply as %) or more, preferably 20%, or more, more preferably 30% or more, even more preferably 50% or more. However, from the viewpoint of diglyceride production, the diglyceride content is preferably 95% or less. The monoglyceride content is preferably 2% or less, more preferably 1.5% or less. The balance of the oil/fat composition is triglyceride. When the diglyceride content is higher than 50%, the oil/fat composition provides a food which prevents accumulation of body fat, and is thus particularly suitable for use as a deep-frying oil for tempura and other similar foods.

The number of carbon atoms of the acyl groups that constitute the diglyceride molecule is preferably 8 to 24, more preferably 16 to 22. The unsaturated acyl groups preferably account for 55% or more, more preferably 70% or more, even more preferably 90% or more, of the entirety of the acyl groups. The diglyceride can be obtained through any suitable method such as a transesterification reaction between oil/fat and glycerin, or an esterification reaction between an oil/fat-derived fatty acid and glycerin. The reaction may be a chemical reaction employing an alkali catalyst, or a biochemical reaction employing oil/fat hydrolase such as lipase.

Example sources of triglyceride, which serves as a starting material in the production of diglyceride, include vegetable oils such as soybean oil, rapeseed coil, palm oil, sunflower oil, rice oil, and corn oil; animal fats and oils such as beef tallow and fish oil; hydrogenated oils thereof; fractionated oils; and random-transesterified oils. Of these, preferred examples are oils or fats that are solid at room temperature but liquid at a cooking temperature of higher than 80° C. (e.g., palm oil), and hydrogenated oils derived from a variety of oils and fats, because they provide a diglyceride-containing oil/fat composition which exhibits highly improved stability against oxidation, and the amount of the oil/fat composition remaining on the surfaces of fried foods obtained through use of the composition is reduced.

The organic carboxylic acids to be incorporated into the oil/fat composition of the present invention as component (B) encompass organic carboxylic acids, salts thereof, and derivatives thereof. From the viewpoint of stability, use of organic carboxylic acids or salts thereof is preferred. Examples of the organic carboxylic acids include C2–C8 (preferably C2–C6) hydroxycarboxylic acid and dicarboxylic acid. Specifically, citric acid, succinic acid, maleic acid, oxalic acid, aconitic acid, itaconic acid, citraconic acid, tartaric acid, fumaric acid, malic acid, ascorbic acid, galacturonic acid, glucuronic acid, and mannuronic acid are preferred, with citric acid, tartaric acid, and malic acid being particularly preferred. Citric acid is commercially available under the trade name "citric acid (crystalline) MG" (product of ADM) or under the trade name "purified crystalline citric acid M" (product of Fuso Chemical Co., Ltd.). Examples of salts of the organic carboxylic acids include alkali metal salts and alkaline earth metal salts of these, with sodium salts and calcium salts being particularly preferred. Derivatives of the organic carboxylic acids include organic acid monoglycerides, such as citric acid monoglyceride, tartaric acid monoglyceride, and a mixture of acetic acid monoglyceride and tartaric acid monoglyceride, with citric acid monoglyceride being particularly preferred.

The amount of component (B) is 70 ppm or more on the basis of the weight of the diglyceride employed. From the viewpoint of the effect of preventing hydrolysis, the amount of component (B) is preferably 70 to 2,000 ppm, more preferably 100 to 1,500 ppm, even more preferably 120 to 1,000 ppm, especially 150–800 ppm, on the basis of the weight of the diglyceride.

The organic carboxylic acids may be provided in the form of extract or so-called crude drug, so long as an organic carboxylic acid is contained. When such extract or crude drug is employed, the amount thereof is such that the organic carboxylic acid content of the extract or crude drug is 70 ppm or more on the basis of the weight of the diglyceride. The extract or the crude drug may be commercially obtained in the forms of powder, concentrate, etc., which are produced through subjecting lemons, yuzu oranges, or plums to extraction.

The organic carboxylic acid content of the oil/fat composition of the present invention can be measured by means of HPLC, or colorimetry employing orthonitrophenylhydrazine (ONPH). For example, citric acid content may be measured through colorimetry as described below.

An oil/fat composition (20 g) heated to 60° C. is placed in a 100-mL separating funnel. Warm water (5 mL, 60° C.) is added thereto, and the funnel is vigorously shaken for two minutes. Subsequently, the funnel is allowed to stand still for phase separation, and the lower phase is taken as a sample solution. The sample solution (2 mL), ONPH solution (1 mL), and ETC solution (1 mL) are placed in a 10-mL measuring flask. The flask is sealed tightly, and heated at 40° C. for 30 minutes, after which 1.5 mol/L NaOH aqueous solution (1 mL) is added thereto, followed by heating at 60° C. for 15 minutes, then cooling to room temperature. Absorbence at 540 nm is measured. By use of calibration curves obtained from aqueous solutions of citric acid of known concentration, the citric acid content is calculated from the following equation.

Citric acid content of oil/fat composition=(Amount of citric acid read from a calibration curve)÷4

As used herein, the ONPH solution is a solution obtained by dissolving 53.6 mg of ONPH (i.e., a hydrochloric acid salt of orthonitrophenylhydrazine) in 10 mL of 0.2 mol/L hydrochloric acid, and the ETC solution is a solution obtained by dissolving 287.6 mg of ETC (i.e., a hydrochloric acid salt of 1-ethyl-3-(3-dimethylaminopropyl) carbodiimide) in 10 mL of a 6% (aqueous) solution of pyridine.

The oil/fat composition of the present invention preferably contains an anti-oxidation agent. Examples of the anti-oxidation agent include natural antioxidants such as rosemary extract; vitamin C, vitamin E, L-proline, butylhydroxyanisole (BHA), butylhydroxytoluene (BHT), and tert-butylhydroquinone (TBHQ).

The mechanism that provides the synergistic effect attained by the combined use of organic carboxylic acid and an anti-oxidation agent in a diglyceride-containing oil/fat composition is not completely clear. One hypothetical mechanism is that since the polarity of the organic carboxylic acid is, as compared with the polarity of tocopherol, close to that of the diglyceride, the organic carboxylic acid is readily soluble in diglyceride and when dissolved therein can fully exert its action as a stabilizer.

Use of a rosemary extract, vitamin C or a derivative of vitamin C, or vitamin E as the anti-oxidation agent is particularly preferred, because the effect obtainable from the use of an anti-oxidation agent increases drastically. These may be used in combination or two or more species. Among a variety of combinations, preferred are rosemary extract—vitamin C, vitamin C—vitamin E, and rosemary extract—vitamin E. The combination of vitamin C, vitamin E, and rosemary extract is particularly preferred.

The rosemary extract may be obtained by drying leaves of rosemary, which belongs to the Perilla family, pulverizing the dried leaves, and subjecting the resultant pulverized material to extraction with water, hot water, hexane, ethanol, acetone, ethyl acetate, or a mixture of any of these solvents. In the present invention, not only can the thus-produced extract be used, but so can oleoresin products formulated by use of the extract, as well as formulations containing rosemanol, carsonol, or isorosemanol, which are constituents of the extract. From the viewpoint of excellent flavor, these extracts are preferably subjected to deodorizing treatment through reduction in pressure, heating under reduced pressure, supercritical fluid extraction, or column adsorption. Hereinafter, the thus-obtained deodorized extracts will be referred to simply as deodorized extracts. The amount of residual solvent in the deodorized extracts is preferably 20 ppm or less, more preferably 15 ppm or less. Examples of commercial products of rosemary extract include HERBER ROCKS TYPE O, HERBER ROCKS TYPE HT-O, HERBER ROCKS TYPE 25, DUOLITE NMH, and DUOLITE NM-1(all these are products of Calsec), and LEOMEAL E and LEOMEAL IO (these two are products of Lion Co., Ltd.). In order to impart an excellent anti-oxidation property to the oil/fat composition of the present invention, the amount of any of these rosemary extracts to be incorporated into the composition is preferably 0.02 to 0.5%, more preferably 0.05 to 0.35%, even more preferably 0.1 to 0.3%, as reduced to the net weight of the extract; i.e., excluding water and organic solvents.

Examples of vitamin C and derivatives thereof include L-ascorbic acid fatty acid esters, among which those esters that are soluble to diglyceride-containing oil/fat compositions are preferred, with higher fatty acid esters of L-ascorbic acid, such as those in which the carbon number in the aryl groups is 12 to 22, being mere preferred, and L-ascorbic acid palmitate and L-ascorbic acid stearate being even more preferred, and L-ascorbic acid palmitate being most preferred.

From the viewpoint of imparting excellent antioxidation property to the oil/fat composition, the amount of vitamin C or a derivative thereof is preferably 0.004% or more, more preferably 0.006 to 0.08%, and even more preferably 0.008 to 0.06%, as reduced to the amount of ascorbic acid.

The vitamin E which may be incorporated into the composition of the present invention is any of $\alpha$-, $\beta$-, $\gamma$-, or $\delta$-tocopherol, or a mixture thereof. From the viewpoint of resistance to heat, $\delta$-tocopherol is preferred. Examples of commercially available vitamin E include E-MIX D and E-MIX 80 (products of Eisai), MDE-6000 (product of Yashiro), and E-oil 400 (product of Riken Vitamin).

In order to impart excellent anti-oxidation properties to the oil/fat composition of the present invention, the vitamin E content of the composition is preferably 0.01% or more, more preferably 0.02 to 0.4%, most preferably 0.05 to 0.3%, in terms of tocopherol.

The amount of the anti-oxidation agent to be incorporated in the oil/fat composition is preferably 0.004 to 0.98%, more preferably 0.01 to 0.8%, more preferably 0.04 to 0.6%. When two or more anti-oxidation agents are used in combination, preferably, the total amount falls within these ranges.

Silicone exhibits a defoaming effect in the oil/fat composition of the present invention, and thus incorporation of silicone into the oil/fat composition of the present invention is preferred. The silicone is available in the form of a variety of formulated products containing, for example, dimethylpolysiloxane, which is known as a food additive. Examples of the silicone include KS-66, KS-69, KF-96, and KM-72, all of which are produced by Shin-Etsu Chemical Co., Ltd., and THF 450 and TSA 737, which are produced by Toshiba Silicone. By addition of silicone to the composition of the present invention, stability against oxidation is further improved, and degradation of flavor during use of the oil composition can be effectively prevented.

The silicone content of the oil/fat composition of the present invention is preferably at least 0.00003%, more preferably 0.00005 to 0.001%, even more preferably 0.0001 to 0.001%.

The oil/fat composition of the present invention can be prepared by adding to a diglyceride-containing oil or fat one or more of the aforementioned organic carboxylic acids and, according to needs, one or more anti-oxidation agents such as rosemary extract; vitamin C or derivatives thereof, and vitamin E, and silicone, and the resultant mixture is appropriately heated with stirring. The rosemary extract, vitamin C derivatives, and vitamin E may be dissolved in advance in a solvent such as ethanol, before being added to the diglyceride-containing oil as fat.

The thus-obtained oil/fat composition of the present invention is stable, is not oxidized or hydrolyzed after having undergone heating or storing for a long time, and is therefore useful as, for example, an edible oil. Moreover, when the oil/fat composition of the present invention is added to ordinary edible oil, stability of the oil against oxidation is improved, to thereby find utility as an antioxidation agent for such ordinary oil.

The oil/fat composition of the present invention is suitable as an oil for use in frying or deep-frying a variety of food ingredients. The fried or deep-fried foods cooked through use of the composition have favorable appearance and flavor.

The oil/fat composition of the present invention is suitable for preparing, but not limited to, snacks such as potato chips, fabricated potato, tortilla chips, and fried beans; deep-fried confectioneries prepared from rice, wheat, soybeans, corn, potato, or sweet potato, such as senbei; french fried potatoes; fried chicken; chicken nuggets; doughnuts; instant noodles; aburage (deep-fried tofu in sheet form); fried breads; fried cakes; fried pies; fried cookies; everyday dishes such as gyoza (fried Chinese dumpling), shumai (fried shaomai), harumaki (spring roll), croquette, cutlets, fried fish fillets, fried shrimps, fried squid fillets, fried oysters, fritters, and tempura; and frozen foods of these. In view that hydrolysis of the oil/fat tends to occur at a frying temperature of lower than 140° C., the frying temperature is preferably at least 140° C., more preferably 150 to 200° C., more preferably 160 to 190° C.

Having generally described this invention, a further understanding can be obtained by reference to certain specific examples which are provided herein for purposes of illustration only and are not intended to be limiting unless otherwise specified.

EXAMPLES

Example 1

The oil/fat compositions shown in Table 1 were prepared by use of the following oils a, b, and c.

Oil a: Oil of high soybean-derived diglyceride content

Soybean fatty acid (650 parts by weight) and glycerin (107 parts by weight) were subjected to esterification by use of Lipozyme IM (product of Novo Nardisk Bioindustry) at 0.07 hPa and 40° C. for 5 hours. The enzyme was filtered off, and the residue was subjected to molecular distillation at 235° C., followed by bleaching and washing with water. To the thus-obtained oil (150 g), 10% citric acid aqueous solution (7.5 g) was added, and the mixture was stirred for 20 minutes at 60° C. Subsequently, the mixture was dehydrated at 110° C. under 0.27 kPa. Deodorization for 2 hours at 234° C. afforded the oil a.

Composition of oil a:

| Glyceride | |
|---|---|
| Triglyceride | 13.0 |
| Diglyceride | 86.9% |
| Monoglyceride | 0.1% |
| Citric acid | 5 ppm |

The glyceride composition in the oil was determined by first subjecting the oil to trimethylsilylation employing a silylating agent (silylating agent TH, product of Kanto Kagaku), and applying the trimethylsilylated product to a gas chromatography column equipped with a flame ionization detector having a capillary column (model: DBTM-1, product of J & W).

Oil b: Oil of high rapeseed-derived diglyceride content

Similar to the procedure used for preparation of oil a, rapeseed fatty acid (650 parts by weight) and glycerin (107 parts by weight) were subjected to esterification and post-treatment, to thereby obtain oil b.

Composition of oil b:

| Glyceride | |
|---|---|
| Triglyceride | 14.2% |
| Diglyceride | 85.7 |
| Monoglyceride | 0.1% |
| Citric acid | 5 ppm |

Oil c: Refined soybean oil (product of Nisshin Seiyu)

| Glyceride | |
|---|---|
| Triglyceride | 98% or more |

TABLE 1

| | Invention | | | | | | | | | | | | Comparative | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 1 | 2 | 3 | 4 |
| Oil a (g) | 100 | 100 | | | | | | | | | | 30 | | | | 100 |
| Oil b (g) | | | 100 | 100 | 100 | 100 | 100 | 100 | 50 | 90 | 100 | 70 | 100 | 100 | | |
| Oil c (g) | | | | | | | | | 50 | 10 | | | | | 100 | |
| Citric acid (ppm) | 100 | 200 | 200 | 500 | 1000 | 5 | 5 | 500 | 250 | 100 | 500 | | 5 | 50 | 200 | 5 |
| Tartaric acid (ppm) | | | | | | 200 | | | | | | | | | | |
| Malic acid (ppm) | | | | | | | 200 | | | | | | | | | |
| Rosemary extract (ppm) | | | | | | | | 2500 | 1250 | 1250 | 2500 | 1250 | | | | 250 |
| L-Ascorbic acid palmitate (ppm) | | | | | | | | 300 | 150 | 150 | 300 | | | | | |
| Vitamin E (ppm) | | | | | | | | 2500 | 1250 | 1250 | 2500 | 1250 | | | | |
| Citric acid monoglyceride (ppm) | | | | | | | | | | | | 500 | | | | |
| Catechin (ppm) | | | | | | | | | | | | | | | | 100 |
| Silicone (ppm) | | | | | | | | | | | | 2 | | | | 2 |

TABLE 1-continued

|  | Invention | | | | | | | | | | | | Comparative | | | |
|---|---|---|---|---|---|---|---|---|---|---|---|---|---|---|---|---|
|  | 1 | 2 | 3 | 4 | 5 | 6 | 7 | 8 | 9 | 10 | 11 | 12 | 1 | 2 | 3 | 4 |
| Amount of organic acid on the basis of diglyceric (ppm) | 121 | 236 | 239 | 589 | 1173 | 245 | 245 | 589 | 588 | 136 | 589 | 587 | 12 | 64 | — | 12 |

Note)
Citric acid: "Citric acid (crystalline) MG" (product of ADM)
Tartaric acid: "DL-tartaric acid" (product of Wako Pure Chemical Industries, Ltd.)
Malic acid: "DL-malic acid" (product of Wako Pure Chemical Industries, Ltd.)
Rosemary extract: "HERBER ROCKS TYPE HT-O" (product of Calsec)
L-Ascorbic acid palmitate: "Vitamin C palmitate" (product of Roche)
Vitamin E: "E-MIX D" (product of Eisai)
Citric acid monoglyceride: "SUNSOFT 621B" (product of Taiyo Kagaku)
Catechin: "YK-85" Product of YMC; catechin purity 90%, ash content 0.5%)
Silicone: "KS-66" (product of Shin-Etsu Chemical Co., Ltd.)

Example 2

Instant Noodles (Cup Noodles)

Using each of the oil compositions obtained from Example 1, instant noodles were produced 400 times continuously. Oil properties, oil appearance, and amount of smoke issued during deep-frying were evaluated at the halfway point and after the 400th deep-frying procedure. Subsequently, the fried noodles were packed in a polypropylene foam package and stored for one month, and then the noodles were evaluated for flavor.

Preparation of Intermediate Noodle and Cooking Conditions

Intermediate noodle: To 100 g of wheat flour was added kansui (i.e., a potassium carbonate- or sodium carbonate-based alkali agent which is essential for the production of Chinese-type noodles; 30 g, prepared by dissolving 4 g of kansui in 1 L of water), and the mixture was kneaded for 10 minutes. Subsequently, the dough was repeatedly subjected to sheeting and rolling, and then the resultant dough sheet was cut with blade No. 22, to thereby obtain noodles having a cross section of about 1.4 mm by 1.4 mm. Thereafter, in a conventional manner, the strands were steamed for 3 minutes, and allowed to stand to cool, to thereby prepare an intermediate noodle (i.e., steamed noodle).

volume of oil=1,500 g The volume reduced after every 40 repetitions of frying operation (which takes 1 hour) was replenished with fresh oil.

Oil temperature=160° C.

Cooking conditions: In a unit cooking operation for producing each noodle product, the intermediate noodle (i.e., steamed noodle; 30 g) was deep-fried in the above oil for 35 seconds to thereby yield an instant noodle.

Storage conditions: temperature=20° C.; relative humidity=65±5% RH; period=one month Reconstitution conditions in hot water: Boiling water (100 g) was poured into the cup container that contained any of the obtained instant noodles, and the cup container was allowed to stand for 3 minutes.

Acid value of oil

A portion of each oil having undergone 200 deep-frying procedures and a portion of each oil having undergone 400 deep-frying procedures were sampled, and the acid value was measured in accordance with Standard Analytical Methods for Oils and Fats 2.3.1-1996 (by Oil Chemists' Society, Japan).

The results are shown in Table 2.

Stability of Oil/fat Against Oxidation

A portion of oil having undergone 400 deep-frying procedures was sampled, and the induction time was measured in accordance with CDM test method specified in Standard Analytical Methods for Oils and Fats 2.5.1.2-1996 (by Oil Chemists' Society, Japan). The results are shown in Table 2.

Each oil was evaluated for flavor and appearance, and, after reconstitution with hot water, each noodle was evaluated for flavor, by 10 panelists and in accordance with the following criteria. The results in terms of average ratings are shown in Table 2.

Flavor of Oils

A: Completely free of any unfavorable taste such as acidity and astringency; remarkably excellent:

B: Almost no unfavorable taste: excellent

C: Slight presence of unfavorable taste such as acidity and astringency

D: Clear presence of unfavorable taste, and disagreeable flavor.

Appearance of Oils

B: No undissolved matter or coloring at 80° C.; good

D: Presence of undissolved matter or coloring at 80° C.; poor

Flavor of Noodles after Reconstitution in Hot Water

A: Completely free of any unfavorable taste such as acidity and astringency; remarkably excellent.

B: Almost no unfavorable taste; excellent

C: Slight presence of unfavorable taste such as acidity and astringency

D: Clear presence of unfavorable taste, and disagreeable flavor.

TABLE 2

| | | Characteristics of frying oil | | | | | | | Instant noodle | |
|---|---|---|---|---|---|---|---|---|---|---|
| | | Acid value (relative value*) | | Anti-oxidation property (induction time) (hours) | | | Conditions of frying oil after 400 repetitions of frying | | Flavor of | Flavor of |
| Oil composition | | After 200 repetitions of frying | After 400 repetitions of frying | Before frying | After 400 repetitions of frying | Appearance before use | Flavor/ appearance | Smoke | cooked noodle | preserved noodle |
| Invention | 1 | 0.98 | 1.00 | 6 | 3.8 | B | B | B | B | B |
| | 2 | 0.98 | 1.00 | 6.5 | 3.9 | B | B | B | B | B |
| | 3 | 1.02 | 1.00 | 6.6 | 4.2 | B | B | B | B | B |
| | 4 | 0.99 | 1.00 | 7.2 | 4.3 | B | B | B | B | B |
| | 5 | 0.96 | 0.99 | 7.4 | 4.3 | B | B | B | B | B |
| | 6 | 0.98 | 1.02 | 6.4 | 3.8 | B | B | B | B | B |
| | 7 | 1.00 | 1.00 | 6.3 | 3.8 | B | B | B | B | B |
| | 8 | 0.99 | 1.00 | 23.5 | 14.5 | B | B | A | A | A |
| | 9 | 1.02 | 0.98 | 21.8 | 13.8 | B | B | A | A | A |
| | 10 | 1.05 | 1.10 | 20.7 | 12.6 | B | B | A | A | A |
| | 11 | 1.01 | 1.00 | 21.1 | 17.2 | B | B | A | A | A |
| Comparative | 1 | 6.25 | 7.95 | 4.7 | 2.9 | B | D | D | C | D |
| | 2 | 4.06 | 5.06 | 5.4 | 3.1 | B | C | C | C | C |
| | 3 | 2.18 | 2.82 | 5.9 | 3.2 | D | C | C | C | C |
| | 4 | 5.95 | 7.00 | 13.5 | 6.3 | B | C | C | C | C |

*Relative value; acid value as measured before deep frying = 1

After 200 frying procedures and 400 frying procedures, the oil/fat compositions of the present invention (Invention oil Nos. 1 to 11) produced less smoke and issued less degradation-related odor than did Comparative oil Nos. 1 to 4. Regarding the deep-fried noodles, as compared with Comparative Products, the products produced by use of the oils of the present invention had excellent flavor without unfavorable oil-derived smell, and also had good appearance. The oil/fat compositions identified as Invention oil Nos. 8 to 11, in which component (B) was used in combination with an anti-oxidation agent, exhibited particularly excellent stability against hydrolysis and oxidation.

Example 3

Potato Chips

Using each of Invention oil Nos. 3, 4, and 8 obtained from Example 1 and Comparative oil No. 1 also obtained from Example 1, deep-frying procedures for potato chips, as described below, were repeated 140 times continuously. Each oil employed was evaluated for acid value and stability against oxidation in accordance with the method described in Example 2. In addition, flavor of the potato chips from the 140th deep-frying lot and that of the potato chips preserved for one month in an aluminum foil laminate package were also evaluated in accordance with the method described in Example 2. The results are shown in Table 3.

Material preparation: Potatoes (Irish cobbler) were peeled, sliced to 1.5 mm thickness, and according to conventional methods, washed with water and then with hot water, to thereby remove starch and exudes from the surfaces. Moisture on the surfaces of the slices was wiped off, to thereby prepare material for deep-frying.

Cooking conditions: In a unit deep-frying operation, 500 g of potato slices were deep-fried in the aforementioned oil for 2.5 minutes, to thereby yield potato chips.

Apparatus and volume of oil: Oil (23 kg) was placed in a gas fryer (model FG-400; product of Tsuji Kikai K.K.). The volume of oil reduced after every 10 repetitions of deep-frying of potato chips was replenished with fresh oil.

Oil temperature=180° C.

Storage conditions: temperature=20° C.: relative humidity=65±5% RH; period=one month

TABLE 3

| | | Acid value (relative value*) | Induction time (hours) | | Conditions of frying oil after 140 repetitions of frying | | Potato chips | |
|---|---|---|---|---|---|---|---|---|
| | | After 140 repetitions of frying | Before frying | After 140 repetitions of frying | Flavor/ appearance | Smoke | Flavor of cooked potato chips | Flavor of preserved potato chips |
| Oil composition | | | | | | | | |
| Invention | 3 | 1.00 | 6.6 | 6.2 | B | B | B | B |
| | 4 | 1.00 | 7.2 | 6.8 | B | B | B | B |
| | 8 | 0.99 | 23.5 | 19.8 | A | A | A | A |
| Comparative | 1 | 4.75 | 4.7 | 3.8 | C | C | C | D |

*Relative value; acid value as measured before deep frying = 1

Example 4

French Fried Potatoes

Using each of Invention oil composition Nos. 3, 4, 8, and 12 obtained from Example 1, and Comparative oil composition No. 1 also obtained from Example 1, deep-frying procedures for french fried potatoes, as described below, were repeated 100 times continuously. The flavor of the french fried potatoes from the 100th deep-frying lot, as well as acid value and stability of oil against oxidation, were examined in accordance with the methods described in Example 2. The results are shown in Table 4.

Material preparation: Whole potatoes (Irish cobbler) with skin were washed with water, each potato was cut along its major axis into 4 to 6 pieces (château), and blanched in water for 15 minutes. Subsequently, moisture on the surfaces was carefully removed by wiping, to thereby prepare material for deep-frying.

Apparatus and volume of oil: Oil (23 kg) was placed in a gas fryer model FG-400; product of Tsuji Kikai K. K.). The volume of oil reduced after every 10 repetitions of deep-frying of french fried potatoes was replenished with fresh oil.

Oil temperature=180° C.

Cooking conditions: In a unit deep-frying operation, 500 g of potatoes were deep-fried in the aforementioned oil for 6 minutes, to thereby yield french fried potatoes.

Co., Ltd.). The volume of oil reduced after every 10 repetitions of deep-frying of one lot of chicken meat pieces was replenished with fresh oil.

Oil temperature=170° C.

Cooking conditions: In a unit deep-frying operation, 200 g of meat pieces were deep-fried in the aforementioned oil for 7 minutes, to thereby yield deep-fried chicken.

TABLE 5

| Oil Composition | | Acid value (relative value*) After 100 repetitions of frying | Induction time (hours) Before frying | Induction time (hours) After 100 repetitions of frying | Fried chicken Flavor of cooked fried chicken |
|---|---|---|---|---|---|
| Invention | 3 | 1.02 | 6.6 | 6.4 | B |
|  | 4 | 1.00 | 7.2 | 6.9 | B |
|  | 8 | 1.01 | 23.5 | 22.3 | A |
| Comparison | 1 | 3.35 | 4.7 | 4.3 | C |

*Relative value; acid value as measured before deep frying = 1

Example 6

Doughnuts

Using each of Invention oil composition Nos. 3, 4, and 8 obtained from Example 1, and Comparative oil composition No. 1 also obtained from Example 1, deep-frying procedures for cooking doughnuts, as described below, were repeated

TABLE 4

| Oil composition | | Acid value (relative value*) After 100 repetitions of frying | Induction time (hours) Before frying | Induction time (hours) After 100 repetitions of frying | Conditions of frying oil after 100 repetitions of frying Flavor/ appearance | Conditions of frying oil after 100 repetitions of frying Smoke | French fried potatoes Flavor of cooked French fried potatoes |
|---|---|---|---|---|---|---|---|
| Invention | 3 | 1.02 | 6.6 | 6.5 | B | B | B |
|  | 4 | 0.99 | 7.2 | 6.9 | B | B | B |
|  | 8 | 1.00 | 23.5 | 21.6 | A | A | A |
|  | 12 | 0.32 | 15.7 | 13.8 | A | A | A |
| Comparative | 1 | 3.25 | 4.7 | 4.2 | C | C | C |

*Relative value; acid value as measured before deep frying = 1

Example 5

Deep-Fried Chicken

Using each of Invention oil composition Nos. 3, 4, and 5 obtained from Example 1, and Comparative oil composition No. 1 also obtained from Example 1, deep-frying procedures for cooking deep-fried chicken, as described below, were repeated 100 times continuously. The flavor of the deep-fried chicken from the 100th deep-frying lot, as well as acid value and stability of the oil against oxidation were examined in accordance with the methods described in Example 2. The results are shown in Table 5.

Material preparation: Chicken dark meat is cut into pieces (slightly larger than bite size). A small amount of salt, pepper and lemon juice are applied thereto and worked sufficiently. Wheat flour is applied to the surfaces of the pieces, to thereby prepare material for deep-frying.

Apparatus and volume of oil: Oil (10 kg) was placed in an electric fryer (model SEF-D9A; product of Sanyo Electric 100 times continuously. The flavor of the doughnuts from the 100th deep-frying lot, as well as acid value and stability of the oil against oxidation were examined in accordance with the methods described in Example 2. The results are shown in Table 6.

Material preparation: Sugar (30 parts by weight; hereinafter "part by weight" is referred to simply as "part"), shortening (New Econa (produced by Kao Corporation; 8 parts), and common salt (1 part) were added to one another, and mixed well in a vertical-type mixer equipped with a heater. Subsequently, white egg (20 parts) and water (35 parts) were gradually added thereto, the mixture was stirred until a creamy material was obtained. Weak wheat flour (80 parts), strong wheat flour (20 parts), and baking powder (3 parts) were added thereto, and the resultant mixture was stirred for 90 seconds. The thus-obtained dough is allowed to stand for 20 minutes at room temperature, then rolled into sheet of about 1 cm thickness. The sheet was punched by use of a doughnut ring cutter having a diameter of 75 mm, to thereby prepare intermediates.

Apparatus and volume of oil: Oil (10 kg) was placed in an electric fryer (model SEF-D9A; product of Sanyo Electric Co., Ltd.). The volume of oil reduced after every 10 repetitions of deep-frying of one lot of doughnuts was replenished with fresh oil.

Oil temperature=180° C.

Cooking conditions: In a unit deep-frying operation, 5 pieces of dough were deep-fried in the aforementioned oil for 7 minutes while occasionally turning upside down, to thereby yield doughnuts.

TABLE 6

| Oil Composition | | Acid value (relative value*) After 100 repetitions of frying | Induction time (hours) Before frying | Induction time (hours) After 100 repetitions of frying | Doughnuts Flavor of produced doughnuts |
|---|---|---|---|---|---|
| Invention | 3 | 1.00 | 6.6 | 6.6 | B |
|  | 4 | 0.98 | 7.2 | 6.9 | B |
|  | 8 | 1.01 | 23.5 | 21.5 | A |
| Comparison | 1 | 3.45 | 4.7 | 4.2 | C |

*Relative value; acid value as measured before deep frying = 1

In Examples 3 to 6, all the cooked foods produced by use of the oil/fat compositions of the present invention (Invention oil Nos. 3, 4, 8, and 12) were found to have excellent flavor. After one month storage, the potato chips produced by use of the oil/fat compositions of the present invention underwent substantially no deterioration in flavor. In contrast, the potato chips produced by use of the oil/fat composition for comparison (Comparative oil No. 1) underwent significant deterioration in favor.

When the oil/fat compositions of the present invention were employed for producing french fried potatoes, deep-fried chicken, and doughnuts, smoke generation was not significant even after increased repetitions of frying operation. Also, there was almost no disagreeable smell from the deep-fried foods. In contrast, when Comparative oil No. 1 was employed, considerable amounts of smoke was generated, and the flavor of the fried foods was deteriorated significantly.

The effects of Invention oil No. 8, in which component (B) and an anti-oxidation agent were used in combination, were particularly excellent.

As described above, the oil/fat composition of the present invention exhibits excellent stability against thermal oxidation and hydrolysis, provides good flavor, and has excellent appearance. Also, fried foods produced by use of the oil/fat composition of the present invention have excellent flavor and good stability for preservation.

Obviously, numerous modifications and variations of the present invention are possible in light of the above teachings. It is therefore to be understood that within the scope of the appended claims, the invention may be practiced otherwise than as specifically described herein.

This application is based on Japanese patent applications 2001-115001 and 2002-41613 filed in the Japanese Patent Office on Apr. 13, 2001 and on Feb. 19, 2002 the entire contents of each of which are hereby incorporated by reference.

What is claimed is:

1. An oil or fat composition comprising:

(A) 15 wt. % or more of a diglyceride;

(B) an organic carboxylic acid:
70 to 2,000 ppm on the basis of the diglyceride; and (C) an anti-oxidation agent
wherein said anti-oxidation agent is at least one selected from the group consisting of rosemary extract, vitamin C or a derivative thereof, vitamin E, L-proline, butylhydroxyanisole (BHA), butylhydroxytoluene (BHT), and tert-butylhydroquinone (TBHQ).

2. The oil or fat composition according to claim 1, comprising 20 to 95% by weight of said diglyceride.

3. The oil or fat composition according to claim 1, further comprising silicone.

4. The oil or fat composition of according to claim 1, wherein said anti-oxidant is selected from the group consisting rosemary extract—vitamin C, vitamin C—vitamin E, and rosemary extract—vitamin E.

5. The oil or fat composition of according to claim 1, wherein said anti-oxidant is rosemary extract present in an amount of 0.02 to 0.5 wt. %.

6. The oil or fat composition of according to claim 1, wherein said anti-oxidant is vitamin C or a derivative thereof present in an amount of 0.0004 wt. % or more, as reduced to the amount of ascorbic acid.

7. The oil or fat composition of according to claim 1, wherein said anti-oxidant is vitamin E present in an amount of 0.01 wt. % or more, in terms of tocopherol.

8. A method of producing fried foods comprising subjecting food ingredients to a cooking process by use of an oil or fat composition comprising:

(A) 15 wt. % or more of a diglyceride; and (B) an organic carboxylic acid:
70 to 2,000 ppm on the basis of the diglyceride.

9. The method of claim 8, wherein said oil or fat comprises 20 to 95% by weight of said diglyceride.

10. The method of claim 8, wherein said organic carboxylic acid is at least one selected from the group consisting of C2–C8 hydroxycarboxylic acids and dicarboxylic acids, salts thereof, and derivatives thereof.

11. The method of claim 8, wherein said oil or fat composition further comprises an anti-oxidation agent.

12. The method of claim 11, wherein said anti-oxidation agent is at least one selected from the group consisting of rosemary extract, vitamin C or a derivative thereof, or vitamin E.

13. The method of claim 11, wherein said anti-oxidant is at least one selected from the group consisting of rosemary extract; vitamin C, vitamin E, L-proline, butylhydroxyanisole (BHA), butylhydroxytoluene (BHT), and tert-butylhydroquinone (TBHQ).

14. The method of claim 11, wherein said anti-oxidant is selected from the group consisting rosemary extract—vitamin C, vitamin C—vitamin E, and rosemary extract—vitamin E.

15. The method of claim 11, wherein said anti-oxidant is rosemary extract present in an amount of 0.02 to 0.5 wt. %.

16. The method of claim 11, wherein said anti-oxidant is vitamin C or a derivative thereof present in an amount of 0.0004 wt. % or more, as reduced to the amount of ascorbic acid.

17. The method of claim 11, wherein said anti-oxidant is vitamin E present in an amount of 0.01 wt. % or more, in terms of tocopherol.

18. The method of claim 8, wherein said oil or fat composition, further comprises silicone.

19. The method of claim 8, wherein said organic acid is selected from the group consisting of citric acid, succinic acid, maleic acid, oxalic acid, aconitic acid, itaconic acid, citraconic acid, tartaric acid, fumaric acid, malic acid, ascorbic acid, galacturonic acid, glucuronic acid, mannuronic acid and a mixture thereof.

20. The method of claim 8, wherein said organic acid is selected from the group consisting of citric acid, tartaric acid, malic acid and a mixture thereof.

21. A fried food produced through subjecting food ingredients to a cooking process by use of an oil or fat composition comprising:
   (A) 15 wt. % or more of a diglyceride; and
   (B) an organic carboxylic acid:
      70 to 2,000 ppm on the basis of the diglyceride.

22. A fried food produced through subjecting food ingredients to a cooking process by use of an oil or fat composition comprising:
   (A) 20 to 95 wt. % of a diglyceride; and
   (B) an organic carboxylic acid:
      70 to 2,000 ppm on the basis of the diglyceride.

23. A fried food produced through subjecting food ingredients to a cooking process by use of an oil or fat composition comprising:
   (A) 15 wt. % or more of a diglyceride; and
   (B) an organic carboxylic acid:
      70 to 2,000 ppm on the basis of the diglyceride; and
   (C) at least one anti-oxidation agent selected from the group consisting of rosemary extract, vitamin C or a derivative thereof, or vitamin E.

* * * * *